(12) United States Patent
Momoo et al.

(10) Patent No.: US 6,741,538 B2
(45) Date of Patent: May 25, 2004

(54) OPTICAL DEVICE FOR RECORDING AND REPRODUCING INFORMATION

(75) Inventors: Kazuo Momoo, Hirakata (JP); Yuichi Takahashi, Nara (JP); Hiroaki Matsumiya, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/023,842

(22) Filed: Dec. 17, 2001

(65) Prior Publication Data
US 2002/0136135 A1 Sep. 26, 2002

(30) Foreign Application Priority Data
Dec. 15, 2000 (JP) ........................................ 2000-381871

(51) Int. Cl.[7] .................................................. G11B 7/00
(52) U.S. Cl. ................. 369/112.01; 369/53.37
(58) Field of Search ..................... 369/112.01, 44.37, 369/94, 53.37, 120

(56) References Cited

U.S. PATENT DOCUMENTS

RE36,445 E  * 12/1999  Miyagawa et al. ........... 369/58

* cited by examiner

Primary Examiner—Nabil Hindi
(74) Attorney, Agent, or Firm—RatnerPrestia

(57) ABSTRACT

An optical pickup for recording and reproducing information on record media is provided. The pickup includes light sources corresponding to the record media, a drive circuit for driving one of the light sources, a switch for switching a connection between the drive circuit and one of the light sources, and a control circuit for controlling the drive circuit and the switch.

With respect to transmission line lengths between the switch and the light sources, the shorter a wavelength of a light source, the shorter the corresponding transmission line length.

16 Claims, 11 Drawing Sheets

(a)

(b)

(c)

(d)

(a)

(b)

(a)

(b)

(a)

(b)

(a)

(b)

(a)

(b)

(a)

(b)

OPTICAL DEVICE FOR RECORDING AND REPRODUCING INFORMATION

BACKGROUND OF THE INVENTION

1. Field of the Invention

The present invention relates to an optical pickup and so on used for an information processing apparatus for optically performing recording, reproduction, erasure and so on of information.

2. Related Art of the Invention

In the case of recording and reproducing on a plurality of record media for recording and reproducing at different wavelengths respectively by a single apparatus, an optical pickup having a plurality of light sources of different wavelengths according to the types of the record media is generally used. FIG. 9 shows a configuration of the optical pickup in the past. Reference numerals 901 and 902 denote light source units of mutually different wavelengths, and though it is not shown, they are comprised of, for instance, a semiconductor laser, a hologram, a photo-detector and so on that are examples of the light sources as one piece. The light emitted from the light source unit 901 passes through a beam splitter (hereinafter, BS) 903, and then it is condensed on a record medium 905 by a condenser lens 904. The light reflected by the record medium 905 enters into the light source unit 901 by following a reverse optical path. The light incident on the light source unit 901 is diffracted by the hologram built into the light source unit, and various signals including focus, tracking and RF are detected by the photo-detector in the light source unit. However, the configuration of the inside of the light source units 901 and 902 and methods of detecting various signals are not substantial components of this technology and the present invention described hereafter, and also various configurations are already in the public domain, so that description thereof will be omitted.

The light emitted from the light source unit 902 is reflected by the BS 903 and then is condensed on the record medium 905 by the condenser lens 904. The light reflected by the record medium 905 enters into the light source unit 902 by following the reverse optical path, and the various signals are detected as with the light source unit 901. The BS 903 synthesizes and separates the lights from the light source units 901 and 902, where a band-pass filter for controlling reflection and transmission of the lights by the wavelength, a polarizing beam splitter for controlling them by polarization, a half mirror for separating them into a transmitted light and a reflected light at an arbitrary ratio and so on are generally used. The light source units 901 and 902 are connected to a drive circuit 906 and a control circuit 907, a drive circuit 908 and a control circuit 909 respectively, and the drive circuit supplies a current to the semiconductor laser that is the light source in the light source unit according to the signal from the control circuit so as to control light emission.

As this configuration in the past has the drive circuit and the control circuit provided to each light source unit, there are large amounts of circuitry in the entire optical pickup so that it has problems such as increased costs and upsizing of the apparatus.

SUMMARY OF THE INVENTION

An object of the present invention is to implement an optical pickup and so on for driving a plurality of light sources with a small amount of circuitry and having high-performance drive characteristics.

One aspect of the present invention is an optical pickup for recording and reproducing information on a plurality of record media respectively, said pick up having:
- a plurality of light sources corresponding to said plurality of record media;
- a drive circuit of driving one of said plurality of light sources;
- switching means of switching a connection between said drive circuit and one of said plurality of light sources; and
- a control circuit of controlling said drive circuit and said switching means, and wherein:
  - as for transmission line lengths between said switching means and said plurality of light sources, the shorter a wavelength of the light source is, the shorter the transmission line length thereof is.

Another aspect of the present invention is an optical pickup for recording and reproducing information on a plurality of record media respectively, said pickup having:
- a plurality of light sources corresponding to said plurality of record media;
- a plurality of drive circuits of driving said plurality of light sources respectively;
- switching means of switching a signal from the outside to one of said drive circuits and outputting it; and
- a control circuit of controlling said drive circuits and said switching means, and wherein:
  - as for transmission line lengths between said switching means and said plurality of light sources, the shorter a wavelength of the light source is, the shorter the transmission line length thereof is.

Still another aspect of the present invention is the optical pickup, wherein, when the wavelength of the light source of the shortest wavelength, of said plurality of light sources, is $\lambda 1$ and the wavelengths of the other light sources are $\lambda 2, \lambda 3, \ldots \lambda n$ ($n=2, 3, 4 \ldots$) in increasing order of wavelength, and the transmission line lengths between said plurality of light sources and said switching means are $L1, L2, L3, \ldots Ln$ in increasing order of wavelength, there is a relationship, between the wavelengths and the transmission line lengths, of $L1/L2 < \lambda 1/\lambda 2$, $L1/L3 \leq \lambda 1/\lambda 3$, $\ldots L2/Ln \leq \lambda 1/\lambda n$.

Yet still another aspect of the present invention is an optical pickup having:
- a first light source of recording or reproducing information on a record medium;
- a second light source of reproducing the information from said record medium;
- a drive circuit of driving said first light source or second light source;
- switching means of switching a connection between said drive circuit and said first light source or second light source; and
- a control circuit of controlling said drive circuit and said switching means, and wherein:
  - a transmission line length between said switching means and said first light source is shorter than that between said switching means and said second light source.

Still yet another aspect of the present invention is an optical pickup having:
- a first light source of recording or reproducing information on a record medium;

a second light source of reproducing the information from said record medium;

a first drive circuit of driving said first light source;

a second drive circuit of driving said second light source;

switching means of switching a signal from the outside to said first drive circuit or said second drive circuit and outputting it; and a control circuit of controlling said first drive circuit, said second drive circuit and said switching means, and wherein:

a transmission line length between said switching means and said first light source is shorter than that between said switching means and said second light source.

A further aspect of the present invention is the optical pickup, wherein said first light source is plurality of light sources corresponding to a plurality of record media, and as for transmission line lengths between said switching means and said plurality of light sources, the shorter a wavelength of the light source is, the shorter the transmission line length thereof is.

A still further aspect of the present invention is the optical pickup, wherein, when the wavelength of the light source of the shortest wavelength, of said plurality of light sources, is $\lambda 1$ and the wavelengths of the other light sources are $\lambda 2$, $\lambda 3$, ... $\lambda n$ (n=2, 3, 4 ...) in increasing order of wavelength, and the transmission line lengths between said plurality of light sources and said switching means are L1, L2, L3, ... Ln in increasing order of wavelength, there is a relationship, between the wavelengths and the transmission line lengths, of $L1/L2 \leq \lambda 1/\lambda 2$, $L1/L3 \leq \lambda 1/\lambda 3$, ... $L1/Ln \leq \lambda 1/\lambda n$.

A yet further aspect of the present invention is the optical pickup, wherein said drive circuit and said switching means are configured as one piece.

A still yet further aspect of the present invention is the optical pickup, wherein said light sources and said switching means are configured as one piece.

An additional aspect of the present invention is the optical pickup, wherein said n is 2 or 3.

A still additional aspect of the present invention is an information processing apparatus having:

an optical pickup according to any of 1st to 10th inventions;

demodulation means of demodulating a signal obtained from said optical pickup; and modulation means of modulating the signal to be outputted to said optical pickup.

A yet additional aspect of the present invention is an optical information recording and reproducing method of recording and reproducing information on a plurality of record media respectively, said method having:

a driving step of driving any one of a plurality of light sources corresponding to said plurality of record media;

a switching step of switching a connection of any one of said plurality of light sources in said driving step; and a controlling step of controlling said driving step and said switching step, and wherein:

as for transmission line lengths of said plurality of light sources in said switching step, the shorter a wavelength of the light source is, the shorter the transmission line length thereof is.

A still yet additional aspect of the present invention is an optical information recording and reproducing method of recording an reproducing information on a plurality of record media respectively, said method having:

a plurality of driving steps of driving a plurality of light sources corresponding to said plurality of record media respectively;

a switching step of switching a signal from the outside to one of said driving steps and using it; and a controlling step of controlling said driving step and said switching step, and wherein:

as for transmission line lengths of said plurality of light sources in said switching step, the shorter a wavelength of any one of said plurality of light sources is, the shorter the transmission line length thereof is.

A supplementary aspect of the present invention is the optical information recording and reproducing method, wherein, when the wavelength of the light source of the shortest wavelength, of said plurality of light sources, is $\lambda 1$ and the wavelengths of the other light sources are $\lambda 2$, $\lambda 3$ ... $\lambda n$ (n=2, 3, 4 ...) in increasing order of wavelength, and the transmission line lengths of said plurality of light sources are L1, L2, L3, ... Ln in increasing order of wavelength thereof, there is a relationship, between the wavelengths and the transmission line lengths, of $L1/L2 \leq \lambda 1/\lambda 2$, $L1/L3 \leq \lambda 1/\lambda 3$, ... $L1/Ln \leq \lambda 1/\lambda n$.

A still supplementary aspect of the present invention is an optical information recording and reproducing method having:

a driving step of driving a first light source for recording or reproducing information on a record medium and a second light source for reproducing the information from said record medium;

a switching step of switching said first light source or second light source in said driving step; and a controlling step of controlling said driving step and said switching step, and wherein:

a transmission line length of said first light source in said switching step is shorter than that of said second light source.

A yet supplementary aspect of the present invention is an optical information recording and reproducing method having:

a first driving step of driving a first light source for recording or reproducing information on a record medium;

a second driving step of driving a second light source for reproducing the information from said record medium;

a switching step of switching a signal from the outside to said first driving step or said second driving step and outputting it; and a controlling step of controlling said first driving step, said second driving step and said switching step, and wherein:

a transmission line length of said first light source in said switching step is shorter than that of said second light source.

Thus, it is become possible to drive a plurality of light sources with small amounts of circuitry and to implement excellent driving characteristics.

And, they have an effect that makes possible to drive a plurality of light sources with small amounts of circuitry. Moreover, by configuring switching means and driving circuit or light source as one piece, it possible to miniaturize, to make low cost and to make high quality an optical pickup and an information processing apparatus.

Figure 1:
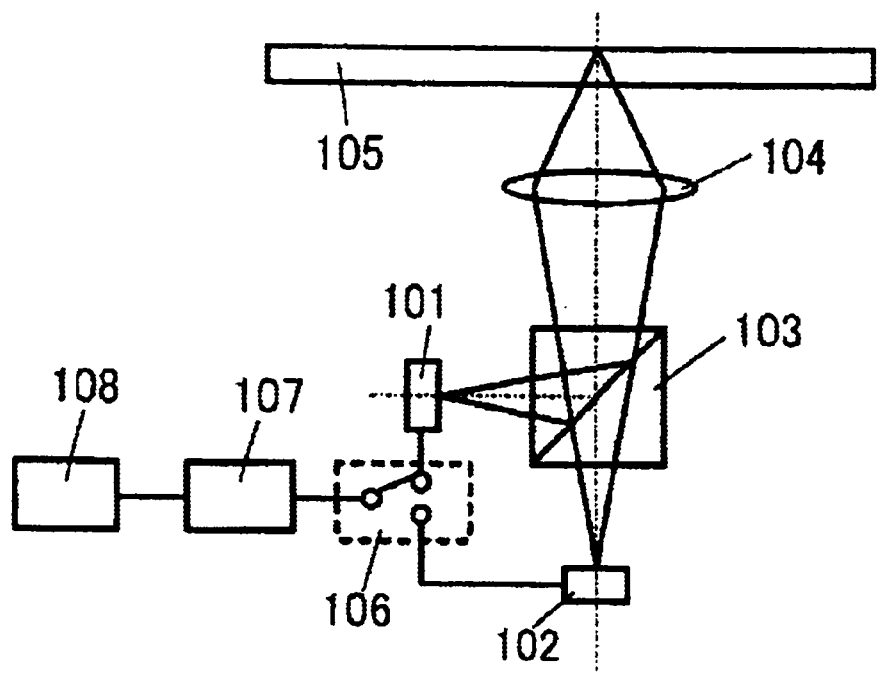
FIG. 1 is a block diagram of an information processing apparatus according to an embodiment 1 of the present invention.

REFERENCE NUMERALS 105, 905 Record media
104, 904 Condenser lens
101, 102, 208, 209, 301, 302, 304, 405, 608, 701, 702, 704, 805, 901, 902 Light source units
103, 303, 305, 306, 703, 705, 706, 903 Beam splitters (BS)
106, 201, 207, 210, 307, 404, 501, 601, 609, 707 Switching means
107, 202, 211, 502, 503, 504, 602, 607, 610, 611, 804, 906, 908 Drive circuits
108, 907, 909 Control circuits
205, 402, 605, 802 Photo-detectors
206, 403, 606, 803 Holograms
203, 212, 603, 612 Units

PREFERRED EMBODIMENTS OF THE INVENTION

The embodiments of an optical pickup of the present invention will be described hereinafter by referring to the drawings, and each embodiment of an optical information recording and reproducing method of the present invention will thereby be described.

Embodiment 1

FIG. 1 is a block diagram of an optical pickup according to an embodiment 1 of the present invention. Reference numerals 101 and 102 denote light source units having light sources of mutually different wavelengths, where the light source unit 101 has a shorter wavelength than that of the light source unit 102. In addition, reference numeral 103 denotes a BS, 104 denotes a condenser lens, 105 denotes a record medium, 106 denotes switching means, 107 denotes a drive circuit, and 108 denotes a control circuit. As an operation of recording and reproducing optical information is the same as the past example in the operations of the above-mentioned respective means, description thereof will be omitted. The switching means 106 switches a signal from the drive circuit 107 to the light source unit 101 or 102 according to the type of the record medium 105.

It is possible, by this configuration, to drive both the light source units 101 and 102 on the single drive circuit 107 and the control circuit 108. Here, the switching means 106 is provided to be close to the light source unit 101 of the shorter wavelength so that a transmission line length between the switching means 106 and the light source unit 101 becomes short as shown in FIG. 1.

In general, if a drive signal passes through the switching means 106, noise rises or matching of impedance collapses so as to distort a driving waveform. This phenomenon is further disadvantageous in the case where the distance between the switching means 106 and the light sources is long due to influence of the impedance of wiring from the switching means 106 to each light source. Accordingly, while it is desirable that the distance between the switching means 106 and each light source is short without exception, it is difficult to set a plurality of light sources so that all the distance between the light sources and the switching means 106 becomes short. Thus, it is desirable to place the switching means 106 close to the light source, of the plurality of light sources, which has higher quality and is required to be driven so as to render the transmission line length short.

In the configuration in FIG. 1, if the wavelength of the light source unit 101 is $\lambda 1$, that of the light source unit 102 is $\lambda 2$, and the number of apertures of the objective lens 104 is NA, the size of a spot condensed on the record medium 105 is in proportion to $\lambda 1/\text{NA}$ as to the light source unit 101 and to $\lambda 2/\text{NA}$ as to the light source unit 102. As the spot of the light source unit of the shorter wavelength (the light source unit 101 in this example) is smaller, it can record and reproduce information of higher density and also requires the light source to have drive characteristics of higher quality.

In this configuration, the switching means 106 is provided close to the light source unit 101 of the shorter wavelength to render the transmission line length short, so that it is possible to curb reduction in driving quality of the light source caused by the above-mentioned switching means and wiring from the switching means to the light source. Thus, it becomes possible to implement appropriate drives to the plurality of light sources requiring mutually different driving quality due to mutually different wavelengths respectively. While this example described the case of two types of wavelengths, it is just the same in the case of having three or more types of wavelengths such as $\lambda 1, \lambda 2, \lambda 3 \ldots \lambda n$ (n=1, 2, ...).

In addition, while this example showed the configuration using the light source unit, the present invention is not limited to this configuration, and it is needless to say that it has the same effect in the placement relation of the plurality of light sources emitting lights and the switching means if, at least, the light source of the shorter wavelength is placed closer and the length of the transmission line between the light source and the switching means is short.

Figure 2:
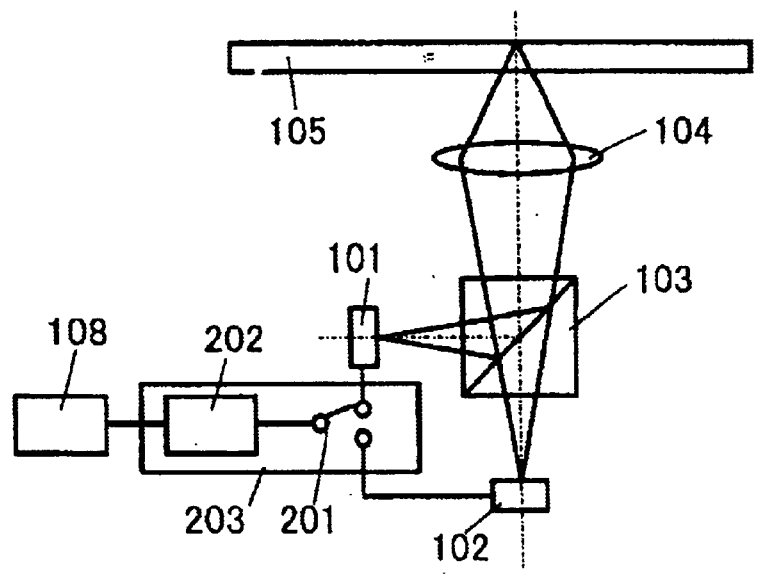
FIG. 2(a) is a diagram showing another configuration example according to the embodiment 1 of the present invention.
FIG. 2(b) is a diagram showing a further configuration example according to the embodiment 1 of the present invention.
FIG. 2(c) is a diagram showing a still further configuration example according to the embodiment 1 of the present invention.
FIG. 2(d) is a diagram showing a still further configuration example according to the embodiment 1 of the present invention.
Figure 2:
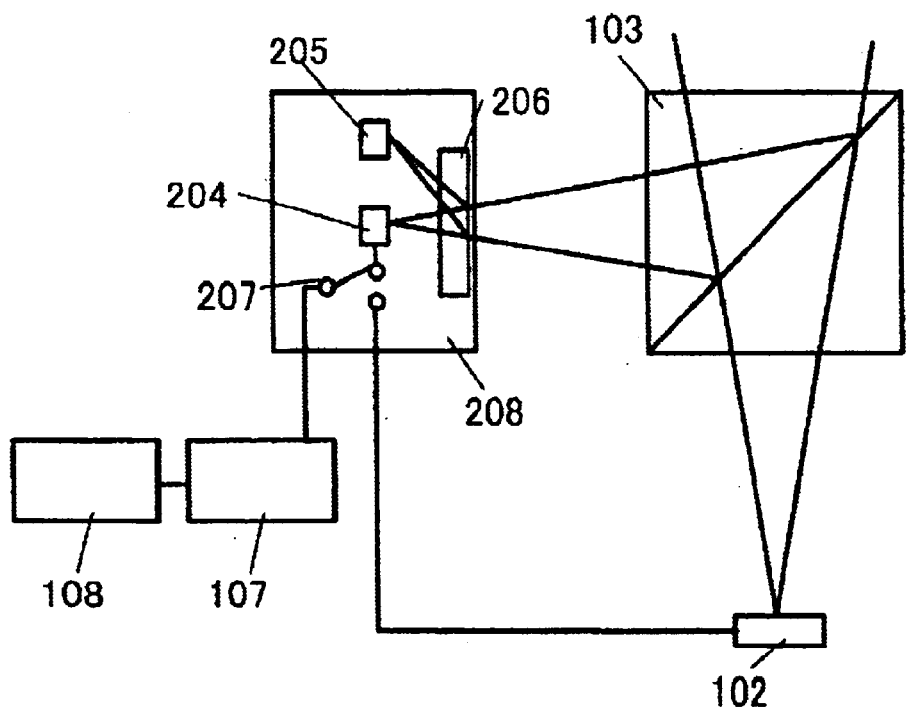
Figure 2:
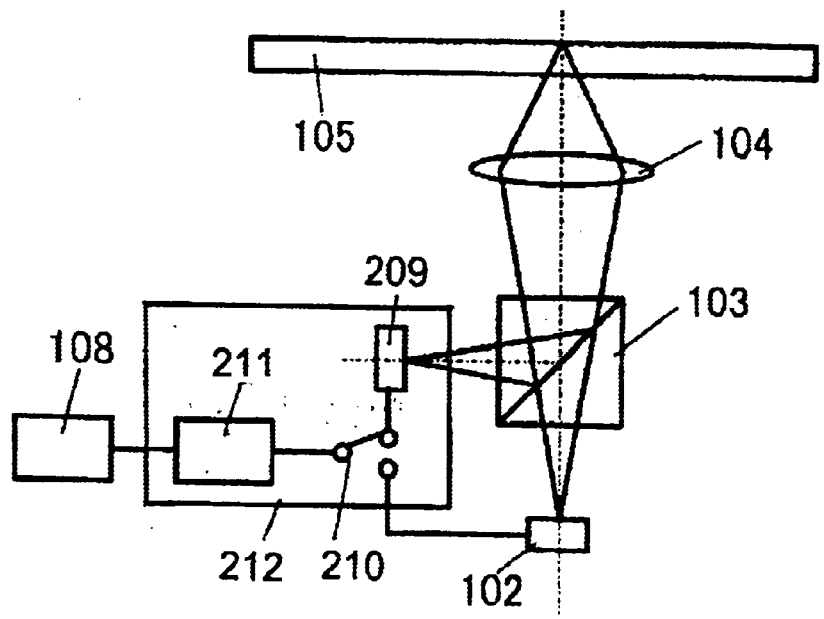
Figure 2:
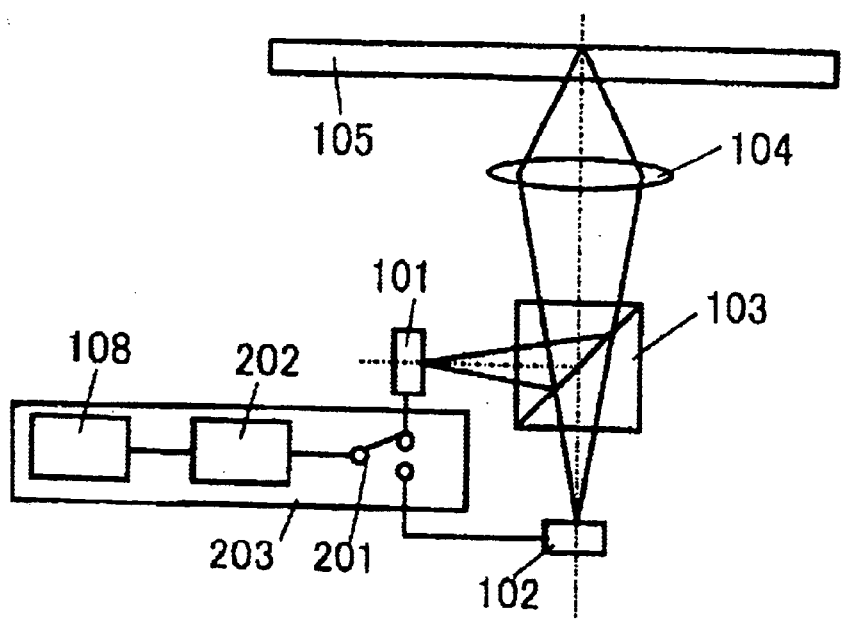

FIG. 2 shows other configurations. In FIG. 2(a), as in FIG. 1, the light source unit 101 is placed closer to switching means 201 than the light source unit 102 so that the transmission line length between the light source unit 101 and the switching means 201 is shorter than that between the light source unit 102 and the switching means 201, this configuration is comprised of a unit 203 having the switching means 201 and a drive circuit 202 as one piece. This configuration has an advantage, in addition to the advantage in the configuration in FIG. 1, that the switching means 201 and the drive circuit 202 configured as one piece can render the transmission line between them even shorter and higher-quality than the configuration in FIG. 1 so as to alleviate increase in noise and reduction in drive characteristics as to the wiring and so on. Here, representative implementation forms as one piece include (1) implementing them on the same printed board, (2) a hybrid IC, and (3) an LSI.

FIG. 2(b) is a configuration example where in a light source 204 and switching means 207 in a light source unit 208 are configured as one piece. In the light source unit 208, the light source 204, a hologram 206 for leading a reflected light from the record medium 105 to a photo-detector 205 and the switching means 207 of switching the light source driven by the drive circuit 107 are configured as one piece. In this configuration, as the light source 204 and the switching means 207 are one-piece, there is the advantage that it can render the transmission line between the light source 204 and the switching means 207 even shorter and higher-quality so as to alleviate the increase in the noise and reduction in drive characteristics due to the wiring and so on. Moreover, the configuration of the light source unit 208 is an example, and it is not limited thereto.

In addition, the point in the present invention is that at least the light source 204 and the switching means 207 are configured as one piece, where the photo-detector 205 and the hologram 206 do not need to be one-piece with the switching means 207. Not to mention, as shown in FIG. 2(c), in the case of the configuration simultaneously satisfying FIGS. 2(a) and 2(b), that is, in the case where a light source 209, switching means 210 and a drive circuit 211 are configured as one piece, it has the advantages of both FIGS. 2(a) and 2(b).

While the switching means is illustrated in the drawing in the form of a switch for the purpose of simplification, it is needless to say that it may have any configuration as long as it is the means capable of switching the signal from the drive circuit such as electric switches, that is, switching by a transistor and an FET for instance and an analog switch, not to mention a mechanical switch.

In addition, when the wavelengths of the light sources are $\lambda 1$ and $\lambda 2$, and the transmission line lengths between the respective light sources and switching means are L1 and L2, the present invention takes effect if it is L1<L2 in the case of $\lambda 1 < \lambda 2$. It has the following reason. To be more specific, if the light source is electrically seen from the drive circuit, the transmission line from the drive circuit (switching and change-over means) to the light source is a load. This load is mainly comprised of a capacity (hereinafter, referred to as "C") component and an inductance (hereinafter, referred to as "L") component, wherein a C component mainly influences rise time of the driving waveform of the light source and an L component influences a ringing waveform of a rise portion of the waveform, and it is needless to say that both of them should preferably be small.

A recording density of the information in the record medium depends on the size of an optical spot formed on the record medium by the condenser lens, and the size of the optical spot is proportional to the wavelength of the light source in the case where the aperture numbers NA of the condenser lenses are equal. For instance, considering the case of the two types of light source $\lambda 1$ and $\lambda 2$ ($\lambda 1 < \lambda 2$), the optical spot formed by the light source $\lambda 1$ has the size of $\lambda 1/\lambda 2$ against $\lambda 2$. This means that, when recording the information on the same track of the record medium, the light source $\lambda 1$ can record $\lambda 2/\lambda 1$ times per track against $\lambda 2$, and when the record medium rotates at the same linear velocity, a transfer rate of the information recorded on the record medium with the light source $\lambda 1$ is $\lambda 2/\lambda 1$ times against $\lambda 2$. The information is recorded on the record medium by modulation of the light source by the drive circuit, and it is needless to say that the rise time of the driving waveform should be shortened in proportion to the transfer rate. Here, while the rise time of the driving waveform is roughly proportional to the C component of the transmission line, the C component of the transmission line is proportional to the transmission line length since a capacity component between the transmission line and the wiring of a nearby power supply, the ground and so on is dominant. Thus, it is possible to set the rise time commensurate with a difference in the transfer rate by rendering the transmission line length L1 of the light sources $\lambda 1$ $\lambda 1/\lambda 2$ times the transmission line length L2 of the light source $\lambda 2$.

Furthermore, in reality, there are the cases where performance required of the light sources of short wavelengths is still severer due to optical factors and so on apart from circuit factors, and in the case of taking such cases into account, it may be desirable to set L1 still shorter than the above wiring allocation. To be more specific, when recording the information with the light sources $\lambda 1$ and $\lambda 2$, there are the cases where the NAs of the condenser lenses are not the same and so the NA corresponding to the light source $\lambda 1$ of the shorter wavelength is set larger than the NA of $\lambda 2$ so as to further improve the recording density. In these cases, as the ratio of the transfer rates of the information becomes larger than $\lambda 2/\lambda 1$, the transfer rate and the rise time can be balanced by setting the ratio L1/L2 of the rise times of the driving waveforms of the light sources smaller than $\lambda 1/\lambda 2$.

For the above reason, it is desirable to set the transmission line length from the switching means to both the light sources of different wavelengths under the condition of $L1/L2 \leq \lambda 1/\lambda 2$ considering the above.

Moreover, while the case of two light sources was described here, it has just the same relationship, that is, L1/L3≦λ1/λ3, ... L1/Ln≦λ2/λn in the case of λ3 ... λn where there are three or more light sources and the wavelengths become longer in order from the wavelength λ2.

In addition, while the above configuration example has the plurality of light sources or light source units independently configured, it is not limited to this configuration. It is just the same in the case where two or more light sources are provided in a single light source unit, where it is needless to say that the excellent effect of the present invention can be obtained by rendering the switching means closer to the light source of the shorter wavelength and making the transmission line length between the light source and the switching means shorter. Moreover, although the configuration of the control circuit 108 has not been referred to, it has the advantage, when the switching means 201 and the control circuit 108 are configured as one piece, that the circuit can be further miniaturized and stabilized in addition to the above advantages. In addition, as shown in FIG. 2(*d*), it has the same advantage in the case where the switching means 201, the control circuit 108 and the drive circuit 202 are configured as one piece.

Embodiment 2

Figure 3:
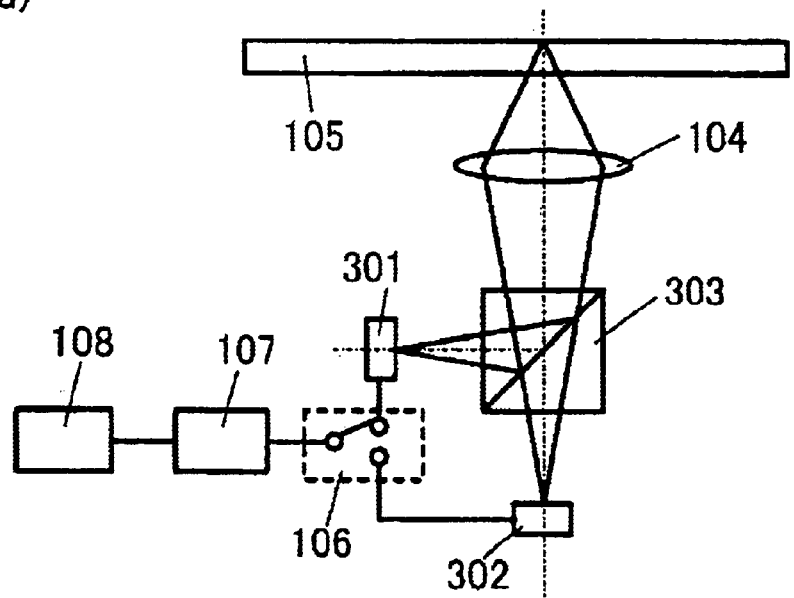
FIG. 3(a) is a block diagram of the information processing apparatus according to an embodiment 2 of the present invention.
FIG. 3(b) is a block diagram of the information processing apparatus according to the embodiment 2 of the present invention.
Figure 3:
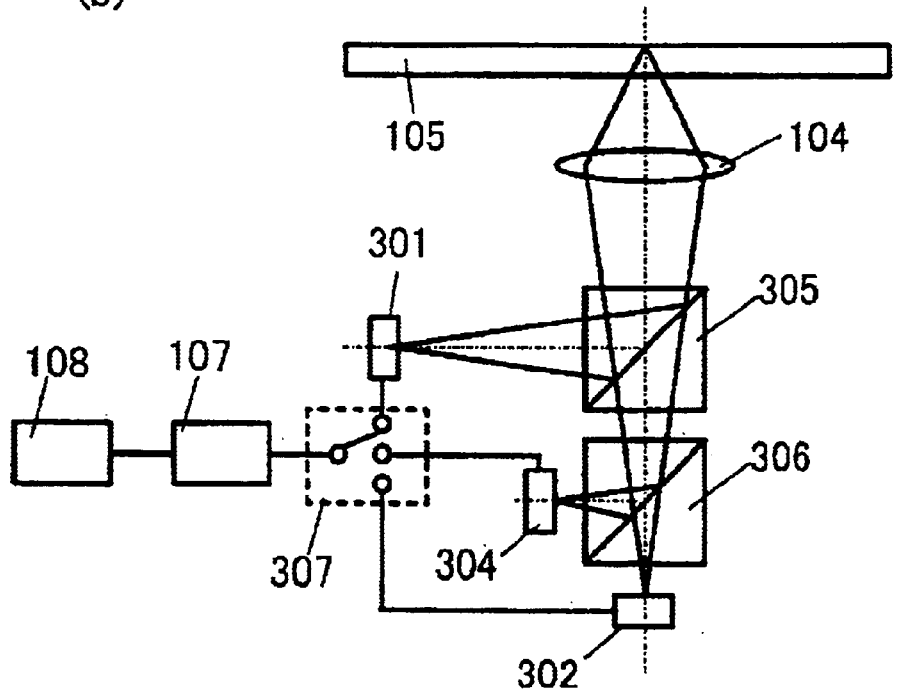

FIG. 3 is a block diagram of the optical pickup of an embodiment 2 of the present invention. In the drawing, the portions that are the same as or equivalent to FIGS. 1 and 2 are numbered likewise and detailed description thereof will be omitted. In addition, reference numeral 301 denotes the light source unit including the first light source of the present invention, and 302 denotes the light source unit including the second light source thereof. In FIG. 3(*a*), the lights from the two light source units 301 and 302 are condensed on the record medium 105 via a BS 303 and the condenser lens 104 so as to record and reproduce the information. Here, the light source unit 301 records and reproduces the information, and the light source unit 302 just reproduces the information. At this time, the wavelengths of the light source units 301 and 302 may be either mutually different or the same.

When comparing the light source units 301 and 302, the light source unit 302 just for reproduction is mostly driven at a fixed output, whereas the light source unit 301 for recording requires high-quality drive characteristics compared with the light source unit 302 since it is modulated at a high speed on recording. To be more specific, while the light source just for reproduction reproduces the information by performing DC light emission at a fixed optical output, the light source for recording requires the light source to be modulated according to recorded information. The quality of a modulated waveform of the light source due to the drive circuit significantly depends on the L component and the C component due to the transmission line from the drive circuit to the light source, but the light source for reproduction performing DC light emission is not so much influenced by the transmission line. For this reason, it is desirable to set the transmission line length of the light source for recording short.

In this configuration, as the switching means 106 is placed close to the light source unit 301 for recording and the transmission line length between the switching means 106 and the light source unit 301 is shorter than that between the switching means 106 and the light source unit 302, it is possible, as its excellent effect, to curb the reduction in driving quality of the light source unit 301 arising from the switching means and the wiring from the switching means to the light source and to excellently drive the light source unit 301 for recording and the light source unit 302 for reproduction on the single drive circuit 107 respectively.

FIG. 3(*b*) is another configuration example, where the light source unit 304 for recording and reproduction is further provided to the configuration of FIG. 3(*a*). Here, the light source unit 302 is for reproduction, and the light source units 301 and 304 are for recording and reproduction, wherein the light source units 301 and 304 have mutually different wavelengths, that is, 301 has the shorter wavelength than 304. The three light source units 301, 302 and 304 are the drive signals from the single drive circuit 107 respectively, which are selectively driven via switching means 307. The switching means 307 is placed closer to the light source units 301 and 304 for recording and reproduction than the light source unit 302 for reproduction, and both the transmission line lengths between the switching means 307 and the light source units 301 and 304 are shorter than that between the switching means 307 and the light source unit 302.

Furthermore, the switching means 307 is placed, of the light source units 301 and 304 for recording and reproduction, closer to the light source unit 301 having the shorter wavelength, and the transmission line length between the switching means 307 and the light source unit 301 is shorter than that between the switching means 307 and the light source unit 304. The same effect as the embodiment 1 is thereby obtained.

According to this configuration, as its excellent effects, it is possible to obtain excellent drive characteristics from the light source for recording and reproduction rather than the light source for reproduction, and it also allows the light source for recording and reproduction to implement excellent drive characteristics on the light source unit 301 having the shorter wavelength and requiring further excellent drive characteristics. While FIG. 3 shows examples of having two or three light source units, it is just the same in the case of having four or more units.

Figure 4:
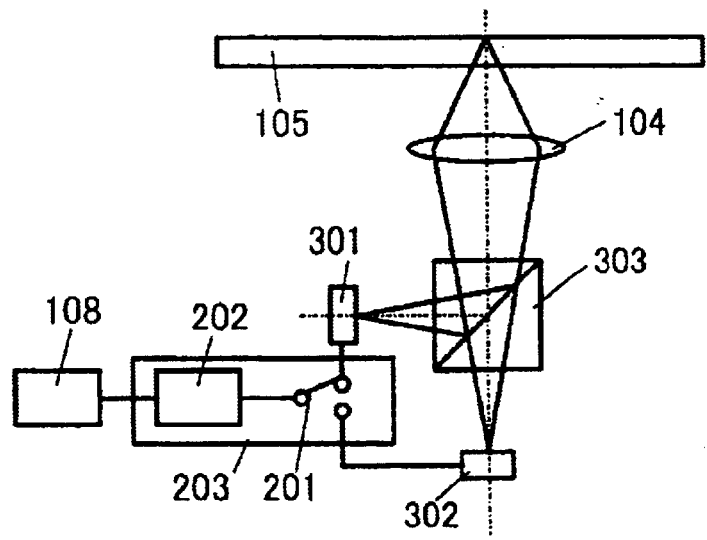
FIG. 4(a) is a diagram showing another configuration example according to the embodiment 2 of the present invention.
FIG. 4(b) is a diagram showing a further configuration example according to the embodiment 2 of the present invention.
Figure 4:
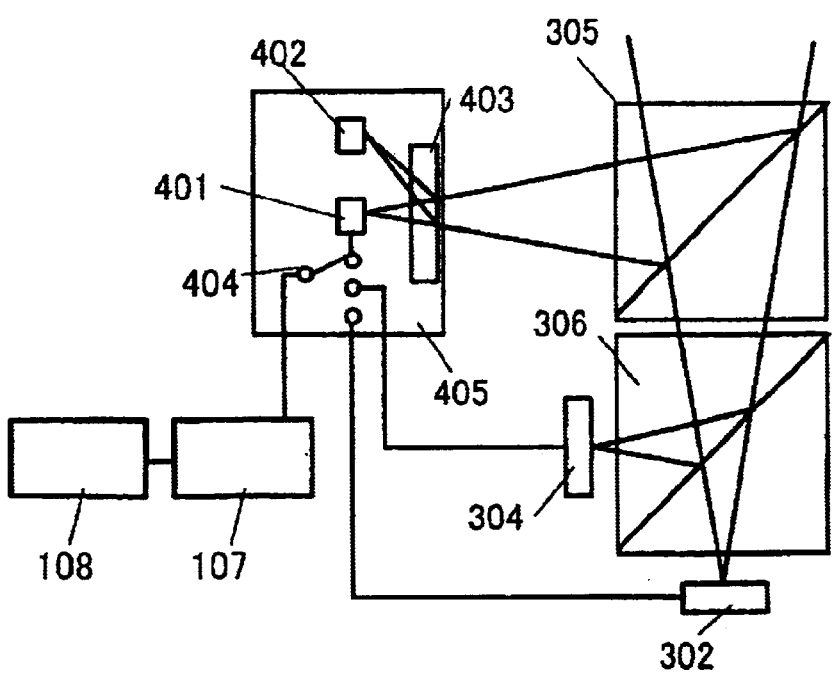

FIG. 4 shows other configuration examples. In the configuration in FIG. 4(*a*), the switching means 201 and the drive circuit 202 are configured as one piece just as the embodiment 1 in FIG. 2(*a*). It is needless to say that the switching means 201 is provided close to the light source unit 301 for recording and reproduction as in FIG. 3 so as to render the transmission line length to the light source unit 301 short. This configuration has the advantage, in addition to the one in FIG. 3, that it can implement the transmission line between the switching means 201 and the drive circuit 202 to be even shorter and higher-quality than the configuration in FIG. 3 so as to alleviate the increase in the noise and the reduction in drive characteristics due to the wiring and so on. While FIG. 4(*a*) shows the case of having two light source units, it is just the same in the case of having three or more units.

In FIG. 4(*b*), a light source 401 and switching means 404 are configured as one piece just as in FIG. 2(*b*). This configuration is comprised of three light source units, that is, the two light source units for recording and reproduction 304 and 405 and the light source unit 302 for reproduction just as in FIG. 3(*b*). The switching means 404 is configured, in a light source unit 405, close to and as one piece with the light source 401 for recording and reproduction and having the shorter wavelength. It thereby has the advantage, in addition to the one in FIG. 3(*b*), that it can implement the transmission line between the light source 401 and the switching means 404 to be even shorter and higher-quality so as to alleviate the increase in the noise and the reduction in drive characteristics due to the wiring and so on. While the switching means is illustrated in the drawing in the form of the switch for the purpose of simplification, it is needless to say that it may have any configuration as long as it is the means capable of switching the signal from the drive circuit such as the electric switches, that is, switching by the transistor and the FET for instance and the analog switch, not to mention the mechanical switch.

In addition, while the above configuration example has the plurality of light sources or light source units independently configured, it is not limited to this configuration. It is just the same in the case where two or more light sources are provided in a single light source unit, where it is needless to say that the excellent effect of the present invention can be obtained by rendering the switching means closer to the light source for recording and reproduction or the light source of the shorter wavelength. Moreover, although the configuration of the control circuit 108 has not been referred to, it has the advantage, when the switching means and the control circuit 108 are configured as one piece, that the circuit can be further miniaturized and stabilized in addition to the above advantages. In addition, as shown in FIG. 2(d) of the embodiment 1, it has the same advantage in the case where the switching means 201, the control circuit 108 and the drive circuit 202 are configured as one piece.

Embodiment 3

Figure 5:
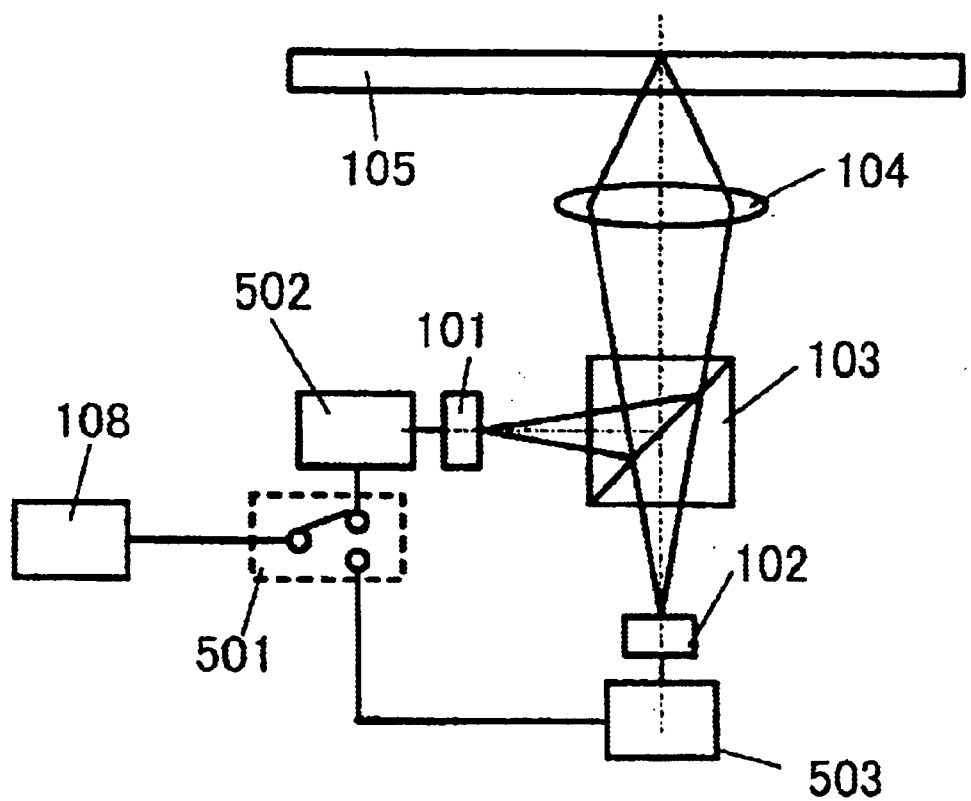
FIG. 5 is a block diagram of the information processing apparatus according to an embodiment 3 of the present invention.

FIG. 5 is a block diagram of an embodiment 3 of the present invention. Reference numerals 101 and 102 are the light source units having the light sources of mutually different wavelengths, where the light source unit 101 has the shorter wavelength than that of the light source unit 102. In addition, reference numeral 103 denotes the BS, 104 denotes the condenser lens, 105 denotes the record medium, 501 denotes the switching means, 502 denotes the drive circuit equivalent to the first drive circuit of the present invention, 503 denotes the drive circuit equivalent to the second drive circuit of the present invention, and 108 denotes the control circuit. As an operation of recording and reproducing the optical information is the same as the past example and the embodiment 1, description thereof will be omitted. The switching means 501 switches the signal from the control circuit 108 to the drive circuit 502 for the light source unit 101 or the drive circuit 503 for the light source unit 102.

This configuration as described above has a plurality of drive circuits corresponding to the plurality of light source units respectively, and has no switching means between the light source unit and the drive circuit as the embodiment 1. Accordingly, it has the advantage that there is no degradation in the drive characteristics due to internal loss of the switching means itself.

Furthermore, this configuration allows both the drive circuits 502 and 503 to be driven by the single control circuit 108, and so it is possible to reduce and miniaturize the circuit compared to the similar configuration in the past.

Here, as shown in FIG. 5, the switching means 501 is provided close to the light source unit 101 of the shorter wavelength so as to render the transmission line length between the switching means 501 and the light source unit 101 via the drive circuit 502 shorter. At this time, the transmission line length between the drive circuit 502 and the light source unit 101 and that between the drive circuit 503 and the light source unit 102 are the same, and the transmission line length between the switching means 501 and the drive circuit 502 is rendered shorter than that between the switching means 502 and the drive circuit 503.

In general, if a control signal from the control circuit 108 passes though the switching means 501, the noise mixes therein or a delay occurs to a control signal waveform. This phenomenon becomes further disadvantageous due to influence of the wiring and so on in the case where the distance between the switching means 501 and the drive circuit or the light source is long. Accordingly, while it is desirable that the distance between the switching means 501 and each light source is short, it is difficult to set the plurality of light sources so that all the distance between the light sources and the switching means 501 becomes short. Thus, it is desirable to place the switching means 501 close to the light source, of the plurality of light sources, which has higher quality and is required to be driven so as to render the transmission line length short.

In the configuration in FIG. 5, if the wavelength of the light source unit 101 is $\lambda 1$, that of the light source unit 102 is $\lambda 2$, and the number of apertures of the objective lens 104 is NA, the size of the spot condensed on the record medium 105 is proportional to $\lambda 1/NA$ as to the light source unit 101 and to $\lambda 2/NA$ as to the light source unit 102. As the spot of the light source unit of the shorter wavelength (the light source unit 101 in this example) is smaller, it can record and reproduce the information of higher density and also requires the light source to have the drive characteristics of higher quality.

In this configuration, the switching means 501 is provided close to the light source unit 101 of the shorter wavelength to render the transmission line length short, so that it is possible to curb reduction in the driving quality of the light source caused by the above switching means and wiring from the switching means to the light source and the drive circuit. Thus, it becomes possible to implement appropriate drives to the light sources requiring mutually different driving quality due to mutually different wavelengths respectively. While this example described the case of two types of wavelengths, it is just the same in the case of having three or more types of wavelengths such as $\lambda 1, \lambda 2, \lambda 3 \ldots \lambda n$ (n=1, 2, ...). In addition, while this example showed the configuration using the light source unit, the present invention is not limited to this configuration, and it is needless to say that it has the same effect in the placement relation of the plurality of light sources emitting lights and the switching means if, at least, the light source of the shorter wavelength is placed closer and the length of the transmission line between the light source and the switching means via the corresponding drive circuits is short. At this time, it is also possible to render the transmission line length between the drive circuit 502 and the light source unit 101 shorter than that between the drive circuit 503 and the light source unit 102 and render the transmission line length between the switching means 501 and the drive circuits 502 the same as that between the switching means 501 and the drive circuits 503.

Figure 6:
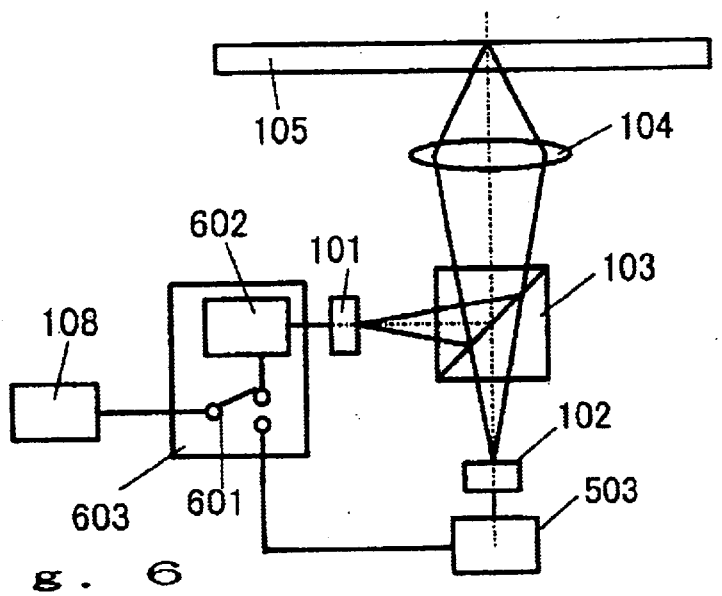
FIG. 6(a) is a diagram showing another configuration example according to the embodiment 3 of the present invention.
FIG. 6(b) is a diagram showing a further configuration example according to the embodiment 3 of the present invention.
Figure 6:
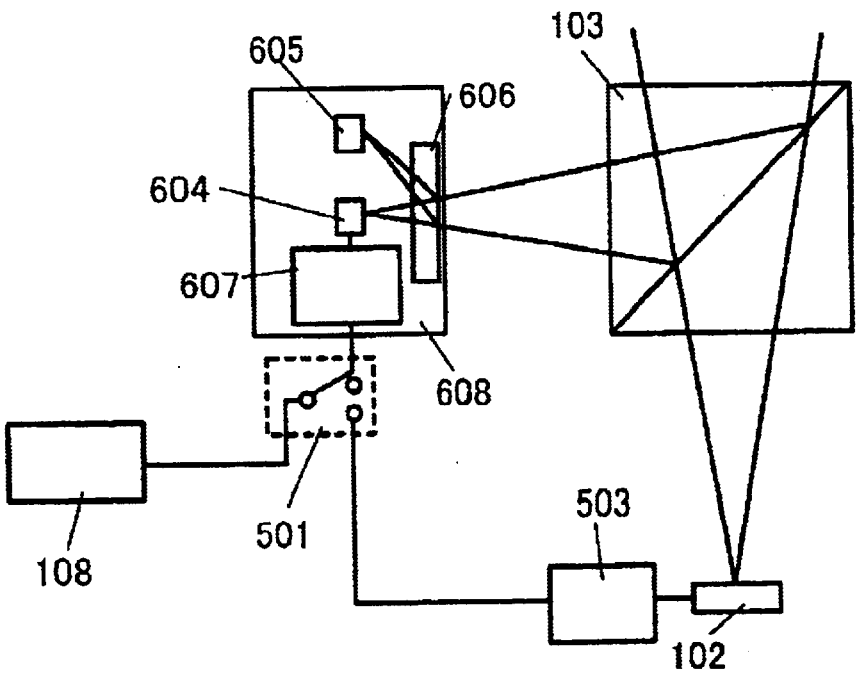

FIG. 6 shows other configurations. In FIG. 6(a), as in FIG. 5, the light source unit 101 is placed closer to switching means 601 than the light source unit 102 so that the transmission line length between the light source unit 101 and the switching means 601 is shorter than that between the light source unit 102 and the switching means 601, this configuration is comprised of a unit 603 having the switching means 601 and a drive circuit 602 as one piece. In this case, as in the example in FIG. 5, the transmission line length between the drive circuit 502 and the light source unit 101 and that between the drive circuit 503 and the light source unit 102 are the same, and in the unit 603, the transmission line length between the switching means 601 and the drive circuits 602 as one piece is rendered shorter than that between the switching means 601 and the drive circuits 503.

This configuration has an advantage, in addition to the advantage in the configuration in FIG. 5, that the switching means 601 and the drive circuit 602 configured as one piece can implement the transmission line between them to be shorter and higher-quality than the configuration in FIG. 5 so as to alleviate the increase in the noise and the reduction in the drive characteristics due to the wiring and so on. Here, representative implementation forms as one piece include (1) implementing them on the same printed board, (2) the hybrid IC, and (3) the LSI.

Figure 10:
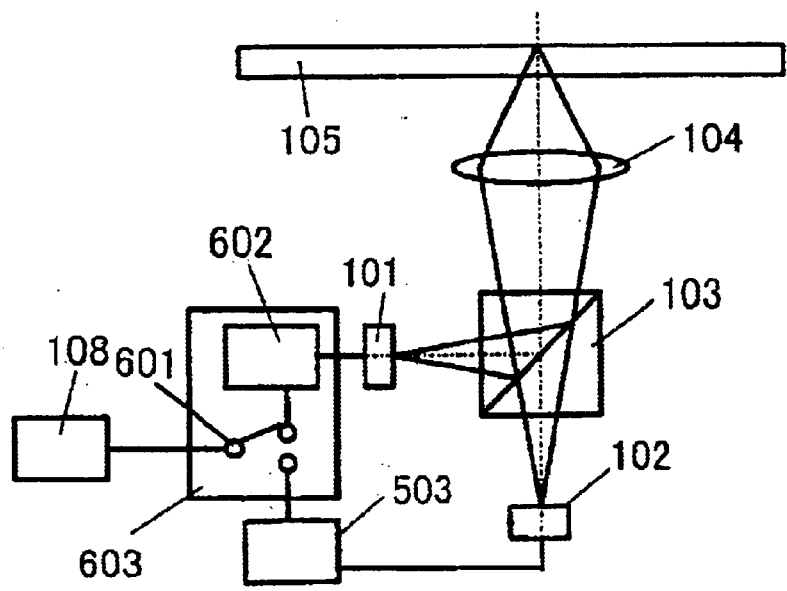
FIG. 10(a) is a diagram showing another configuration example according to the embodiment 3 of the present invention.
FIG. 10(b) is a diagram showing a further configuration example according to the embodiment 3 of the present invention.
Figure 10:
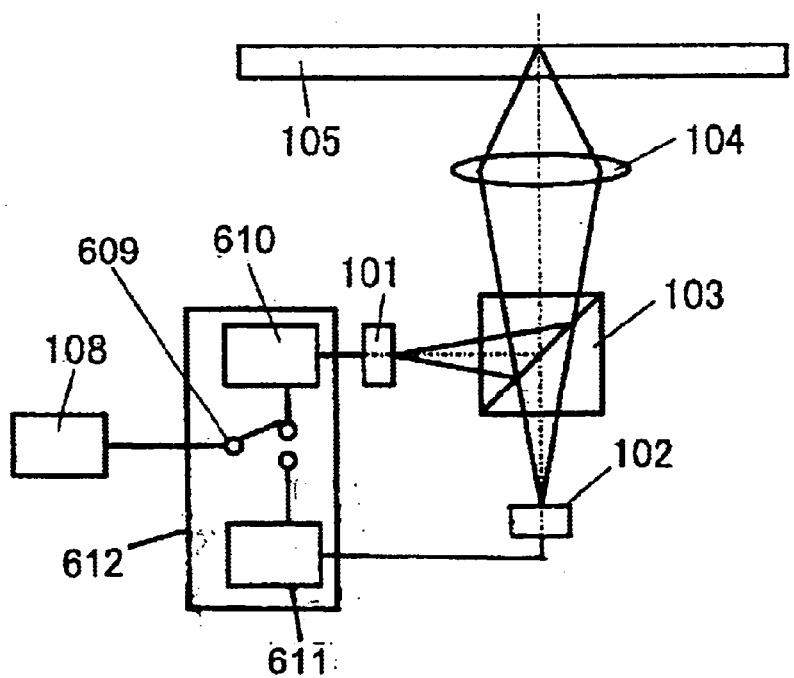

Moreover, as shown in FIG. 10(a), it is also possible in the unit 603 to render the transmission line length between the switching means 601 and the drive circuits 602 as one piece the same as that between the switching means 601 and the drive circuits 503 and render the transmission line length between the drive circuit 602 and the light source unit 101 shorter than that between the drive circuit 503 and the light source unit 102 so that the transmission line length between the light source unit 101 and the switching means 601 becomes shorter than that between the light source unit 102 and the switching means 601.

Furthermore, it is also possible, as shown in FIG. 10(b), to have the configuration having a unit 612 wherein the switching means 609, the drive circuit 610 for the light source unit 101, and the drive circuit 611 for the light source unit 102 are rendered as one piece. In this case, in the unit 612, it is desirable that the transmission line length between the switching means 609 and the drive circuit 610 rendered as one piece and that between the switching means 609 and the drive circuit 611 are the same, and the transmission line length between the drive circuit 610 and the light source unit 101 is rendered shorter than that between the drive circuit 611 and the light source unit 102 so as to render the transmission line length between the light source unit 101 and the switching means 609 shorter than that between the light source unit 102 and the switching means 609.

In addition, though it is not shown, it is also possible to configure the control circuit 108 and unit 612 as one piece. Because of becoming shorter the transmission line length between the control circuit 108 and switching means 609, this configuration has advantages such as improve of S/N, miniaturization of the apparatus or the like.

FIG. 6(b) is a configuration example wherein a light source 604 and a drive circuit 607 in a light source unit 608 are configured as one piece. In the light source unit 608, the light source 604, a hologram 606 for leading a reflected light from the record medium 105 to a photo-detector 605 and the drive circuit 607 for driving the light source 604 are configured as one piece. In this configuration, as the light source 604 and the drive circuit 607 are one-piece, there is the advantage that it can implement the transmission line between them to be shorter and higher-quality so as to alleviate the increase in the noise and reduction in drive characteristics due to the wiring and so on. Moreover, the configuration of the light source unit 608 is an example, and it is not limited thereto.

In addition, the point in the present invention is that the light source 604 and the drive circuit 607 are configured as one piece, where the photo-detector 605 and the hologram 606 do not need to be one-piece. Though it is not shown, it is needless to say that, in the case of the configuration simultaneously satisfying FIGS. 6(a) and 6(b), that is, in the case where the light source, the switching means and the drive circuit are configured as one piece, it has the advantages of both FIGS. 6(a) and 6(b).

In addition, it is needless to say that, it is also possible to have the configuration simultaneously satisfying FIGS. 6(b) and 10(b), that is, the light source, the switching means and the two drive circuits configured as one piece and in this case, it has the advantages of both FIGS. 6(b) and 10(b).

While the switching means is illustrated in the drawing in the form of a switch for the purpose of simplification, it is needless to say that it may have any configuration as long as it is the means capable of switching the signal from the control circuit such as the electric switches, that is, switching by the transistor and the FET for instance and the analog switch, not to mention a mechanical switch. In addition, there are the cases where, to avoid influence of electrical noise from the outside, the signal from the control circuit to the drive circuit is transmitted by using the light with an optical fiber, an optical waveguide and so on. While an optical switch and so on are used as the switching means then, it is needless to say that the switching means such as the optical switch is placed close to the light source of the shorter wavelength also in this case so that the transmission line length between the switching means and the light source becomes shorter so as to have the excellent effect of the present invention.

In addition, while the above configuration example has the plurality of light sources or light source units independently configured, it is not limited to this configuration. It is just the same in the case where two or more light sources are provided in a single light source unit, where it is needless to say that the excellent effect of the present invention can be obtained by rendering the switching means closer to the light source of the shorter wavelength. Moreover, although the configuration of the control circuit 108 has not been referred to, it has the advantage, when the switching means and the control circuit 108 are configured as one piece, that the circuit can be further miniaturized and stabilized in addition to the above advantages. In addition, as shown in FIG. 2(d) of the embodiment 1, it has the same advantage in the case where the switching means 201, the control circuit 108 and the drive circuit 202 are configured as one piece.

In addition, it is desirable for the same reason as the embodiment 1 that, when the shorter wavelength is $\lambda 1$, the transmission line length thereof is L1, and the other wavelength is $\lambda 2$ and the corresponding transmission line lengths is L2, the transmission line length from the switching means to the two light sources of different wavelengths is set under the condition of $L1/L2 \leq \lambda 1/\lambda 2$, and it is also desirable that, in the case of $\lambda 3 \ldots \lambda n$ where there are three or more light sources and the wavelengths become longer in order from the wavelength $\lambda 2$, it has just the same relationship such as $L1/L3 \leq \lambda 1/\lambda 3, \ldots L1/Ln \leq \lambda 1/\lambda n$.

Embodiment 4

Figure 7:
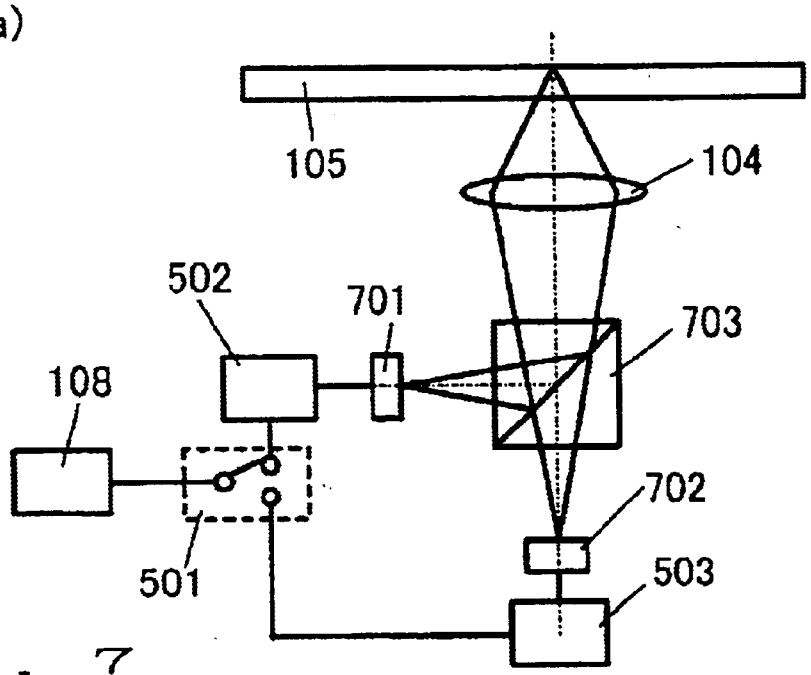
FIG. 7(a) is a block diagram of the information processing apparatus according to an embodiment 4 of the present invention.
FIG. 7(b) is a block diagram of the information processing apparatus according to the embodiment 4 of the present invention.
Figure 7:
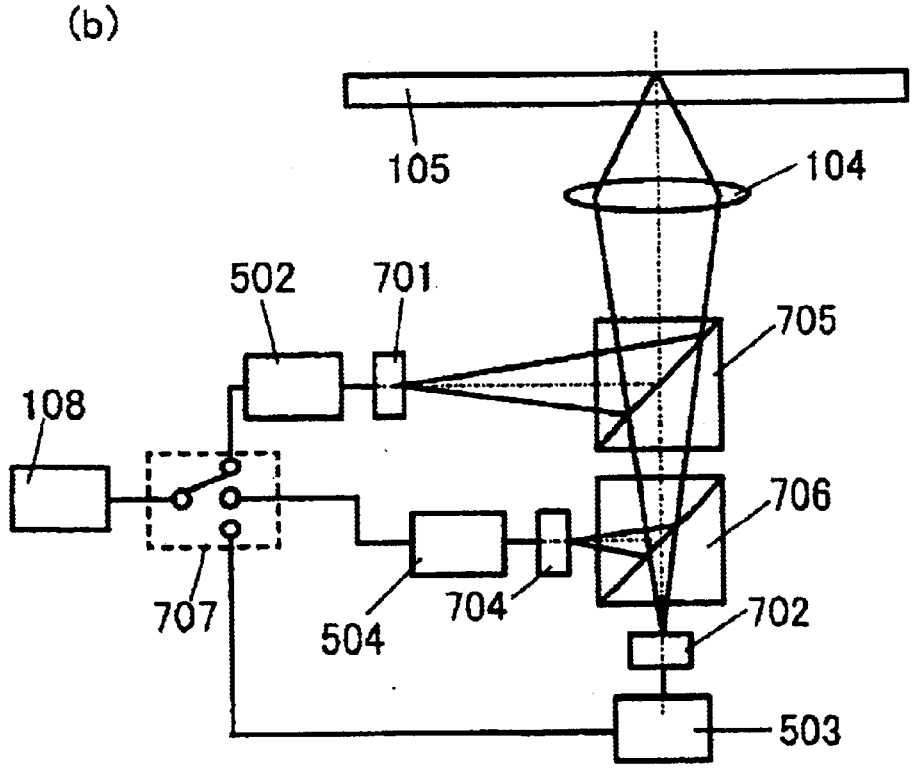

FIG. 7 is a block diagram of an embodiment 4 of the present invention. In the drawing, the portions that are the same as or equivalent to FIGS. 5 and 6 are numbered likewise and detailed description thereof will be omitted. In addition, reference numeral 701 denotes the light source unit including the first light source of the present invention, and 702 denotes the light source unit including the second light source thereof. In FIG. 7(a), the lights from the two light source units 701 and 702 are condensed on the record medium 105 via the BS 703 and the condenser lens 104 so as to record and reproduce the information. Here, the light source unit 701 records and reproduces the information, and the light source unit 702 just reproduces the information. At this time, the wavelengths of the light source units 701 and 702 may be either mutually different or the same.

The switching means 501 switches the signal from the control circuit 108 to the drive circuit 502 for the light source unit 701 or the drive circuit 503 for the light source unit 702.

When comparing the light source units 701 and 702, the light source unit 702 just for reproduction is mostly driven at a fixed output, whereas the light source unit 701 for recording requires high-quality drive characteristics compared with the light source unit 702 since it is modulated at a high speed on recording. To be more specific, just as in the embodiment 2, the light source just for reproduction reproduces the information by performing DC light emission at the fixed optical output, whereas the light source for recording requires the light source to be modulated according to recorded information. The quality of the modulated waveform of the light source due to the drive circuit significantly depends on the L component and the C component due to the transmission line from the drive circuit to the light source, but the light source for reproduction performing DC light emission is not so much influenced by the transmission line. For this reason, it is desirable to set the transmission line length of the light source for recording short.

In this configuration, as shown in FIG. 7(a), the switching means 501 is placed close to the light course unit 701 for recording and reproduction and the transmission line length between the switching means 501 and the light source unit 701 via the drive means 502 is shorter than that between the switching means 106 and the light source unit 702 via the drive means 503, and so it is possible, as its excellent effect, to curb the reduction in driving quality of the light source unit 701 arising from the switching means to the light source and to excellently drive the light source unit 701 for recording and the light source unit 702 for reproduction of the single control circuit 108 respectively.

In addition, this configuration has the plurality of drive circuits corresponding to the plurality of light source units respectively, and has no switching means between the light source unit and the drive circuit as the embodiment 2. Accordingly, it has the advantage that there is no degradation in the drive characteristics due to internal loss of the switching means itself. Furthermore, this configuration allows both the drive circuits 502 and 503 to be driven by the single control circuit 108, and so it is possible to reduce and miniaturize the circuit compared to the similar configuration in the past.

FIG. 7(b) is another configuration example, where the light source unit 704 for recording and reproduction is further provided to the configuration of FIG. 7(a). Here, the light source unit 702 is for reproduction, and the light source units 701 and 704 are for recording and reproduction, wherein the light source units 701 and 704 are selectively driven via the switching means 707 with mutually different wavelengths, that is, 701 has the shorter wavelength than 704. The three light source units 701, 702 and 704 are selectively driven via the switching means 707 with the drive signals from the single drive circuit 108 respectively. The switching means 707 is placed closer to the light source units 701 and 704 for recording and reproduction than the light source unit 702 for reproduction, and both the transmission line lengths between the switching means 707 and the light source units 701 and 704 are shorter than that between the switching means 707 and the light source unit 702.

Furthermore, the switching means 707 is placed, of the light source units 701 and 704 for recording and reproduction, closer to the light source unit 701 having the shorter wavelength, and the transmission line length between the switching means 707 and the light source unit 701 is shorter than that between the switching means 707 and the light source unit 704. The same effect as the embodiment 1 is thereby obtained.

According to this configuration, as its excellent effects, it is possible to obtain excellent drive characteristics from the light source for recording and reproduction rather than the light source for reproduction, and it also allows the light source for recording and reproduction to implement excellent drive characteristics on the light source unit 701 having the shorter wavelength and requiring further excellent drive characteristics. While FIG. 7 shows examples of having two or three light source units, it is just the same in the case of having four or more units.

Figure 8:
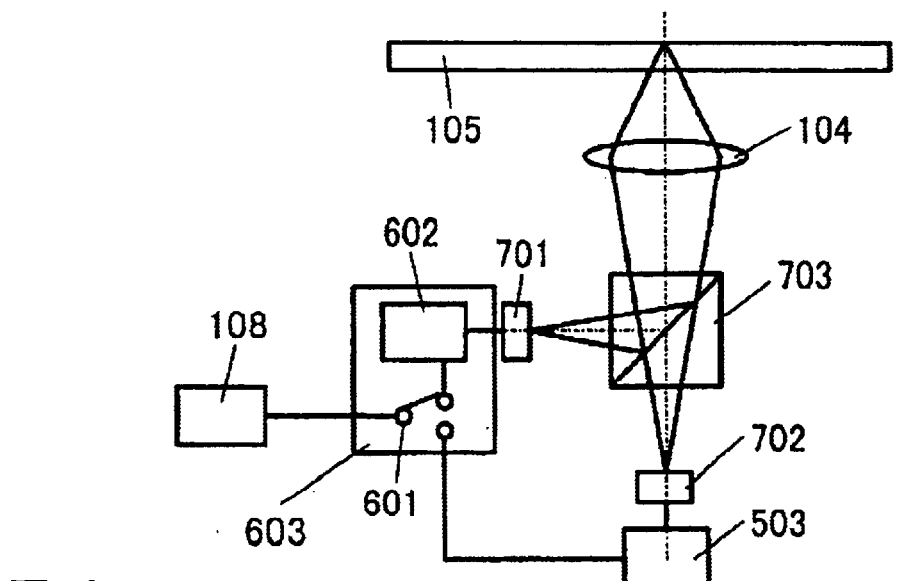
FIG. 8(a) is a diagram showing another configuration example according to the embodiment 4 of the present invention.
FIG. 8(b) is a diagram showing a further configuration example according to the embodiment 4 of the present invention.
Figure 8:
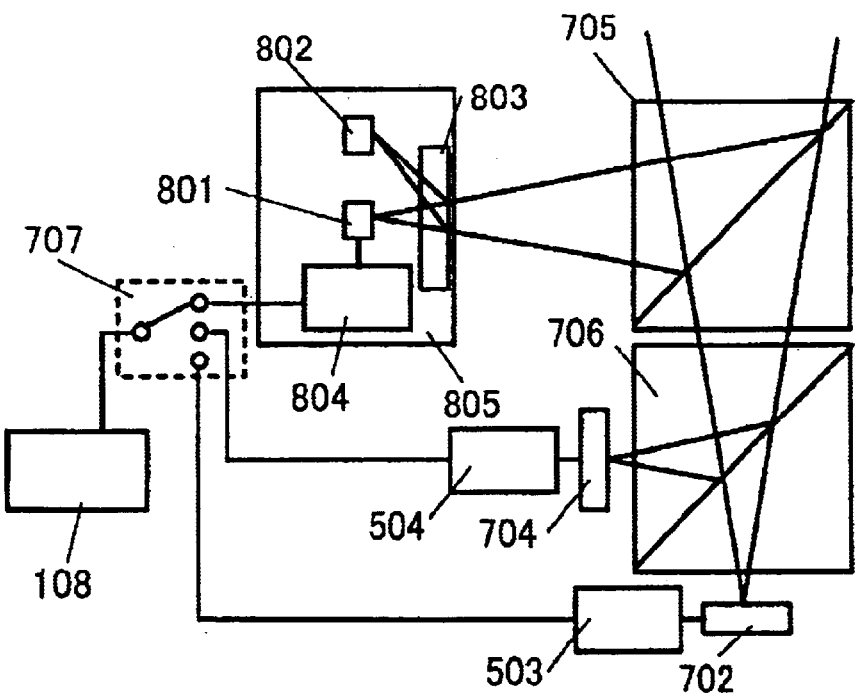
Figure 9:
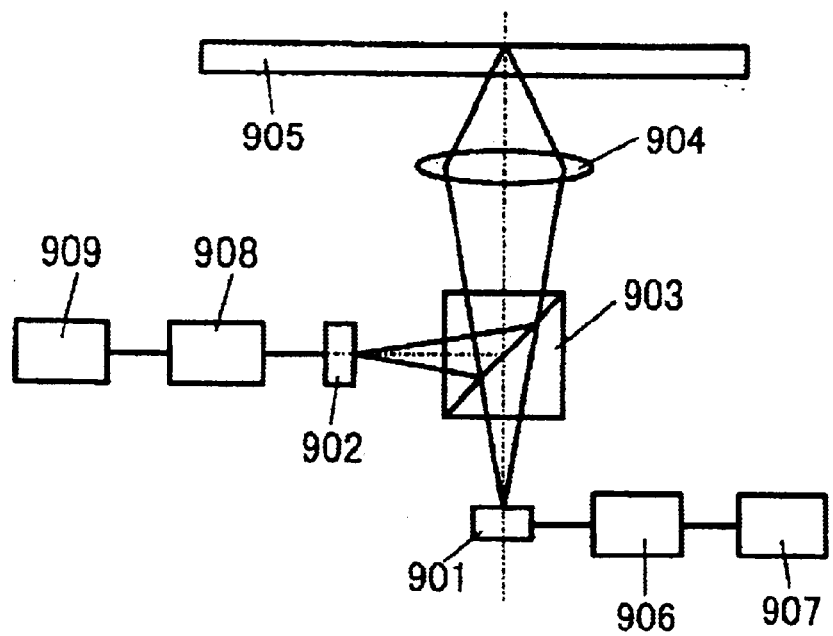
FIG. 9 is a block diagram of an optical pickup of the prior art.

FIG. 8 shows other configuration examples. In the configuration in FIG. 8(a), the switching means 601 and the drive circuit 602 are configured as one piece just as the embodiment 3 in FIG. 6(a). It is needless to say that the switching means 601 is provided close to the light source unit 701 for recording and reproduction as in FIG. 7 so as to render the transmission line length to the light source unit 701 short. This configuration has the advantage, in addition to the one in FIG. 7, that it can implement the transmission line between the switching means 601 and the drive circuit 602 to be even shorter and higher-quality than the configuration in FIG. 7 so as to alleviate the increase in the noise and the reduction in drive characteristics due to the wiring and so on. While FIG. 8(a) shows the case of having two light source units, it is just the same in the case of having three or more units. In FIG. 8(b), a light source 801 and a drive circuit 804 are configured as one piece just as in FIG. 6(b). This configuration is comprised of three light source units, that is, the two light source units for recording and reproduction 805 and 704 and the light source unit for reproduction 702 just as in FIG. 7(b). The drive circuit 804 is configured, in the light source unit 805, close to and as one piece with the light source 801 for recording and reproduction and having the shorter wavelength. It thereby has the advantage, in addition to the one in the configuration in FIG. 7(b), that the transmission line between the light source 801 and the drive circuit 804 can be rendered even shorter and higher-quality so as to alleviate the increase in the noise and the reduction in the drive characteristics due to the wiring and so on.

In addition, though it is not shown, it is also possible to configure the switching means and the plurality of drive circuits as one piece in the configuration in FIGS. 8(a) and 8(b) just as the configuration shown in FIG. 10(b) of the embodiment 3. It is needless to say also in this case that it has the same effect as the configuration in FIG. 10(b).

While the switching means is illustrated in the drawing in the form of a switch for the purpose of simplification, it is needless to say that it may have any configuration as long as it is the means capable of switching the signal from the control circuit such as the electric switches, that is, switching by the transistor and the FET for instance and the analog switch, not to mention a mechanical switch. In addition, there are the cases where, to avoid the influence of the electrical noise from the outside, the signal from the control circuit to the drive circuit is transmitted by using the light with the optical fiber, the optical waveguide and so on. While the optical switch and so on are used as the switching means then, it is needless to say that the switching means such as the optical switch is close to the light source of the shorter wavelength also in this case so as to have the excellent effect of the present invention.

In addition, it is desirable for the same reason as the embodiment 1 that, when the shorter wavelength is $\lambda 1$, the transmission line length thereof is L1, and the other wavelength is $\lambda 2$ and the corresponding transmission line lengths is L2, the transmission line length from the switching means to the two light sources of different wavelengths such as the light source units 702 and 704 is set under the condition of $L1/L2 \leq \lambda1/\lambda2$, and it is also desirable that, in the case of $\lambda3 \ldots \lambda n$ where there are three or more light sources and the wavelengths become longer in order from the wavelength $\lambda2$, it has just the same relationship such as $L1/L3 \leq \lambda1/\lambda3, \ldots L1/Ln \leq \lambda1/\lambda n$.

While the above configuration example has the plurality of light sources or light source units independently configured, it is not limited to this configuration. It is just the same in the case where two or more light sources are provided in a single light source unit, where it is needless to say, also in that case, that the excellent effect of the present invention can be obtained by rendering the switching means closer to the light source for recording and reproduction or the light source of the shorter wavelength. Moreover, although the configuration of the control circuit 108 has not been referred to, it has the advantage, when the switching means and the control circuit 108 are configured as one piece, that the circuit can be further miniaturized and stabilized in addition to the above advantages. In addition, as shown in FIG. 2(*d*) of the embodiment 1, it has the same advantage in the case where the switching means 201, the control circuit 108 and the drive circuit 202 are configured as one piece.

Moreover, while the above embodiments have been described as the optical pickup, the present invention may also be implemented as an information processing apparatus having demodulation means of demodulating the signal obtained from the optical pickup of the present invention and modulation means of modulating the signal to be outputted to the optical pickup.

As described above, according to the present invention, it is possible, as the excellent effects thereof, to drive the plurality of light sources with a small amount of circuitry and implement high-performance drive characteristics.

What is claimed is:

1. An optical pickup for recording and reproducing information on a plurality of record media respectively, said pick up having:
   a plurality of light sources corresponding to said plurality of record media;
   a drive circuit of driving one of said plurality of light sources;
   switching means of switching a connection between said drive circuit and one of said plurality of light sources; and
   a control circuit of controlling said drive circuit and said switching means, and wherein:
      the transmission line lengths between said switching means and each one of said plurality of light sources, have a relationship that the shorter the wavelength of the light source, the shorter the length of the corresponding transmission line.

2. An optical pickup for recording and reproducing information on a plurality of record media respectively, said pickup having:
   a plurality of light sources corresponding to said plurality of record media;
   a plurality of drive circuits of driving said plurality of light sources respectively;
   switching means of switching a signal from the outside to one of said drive circuits and outputting it; and
   a control circuit of controlling said drive circuits and said switching means, and wherein:
      the transmission line lengths between said switching means and each one of said plurality of light sources, have a relationship that the shorter the wavelength of the light source, the shorter the length of the corresponding transmission line.

3. The optical pickup according to claim 1 or 2, wherein when the wavelength of the light source of the shortest wavelength, of said plurality of light sources, is $\lambda1$ and the wavelengths of the other light sources are $\lambda2, \lambda3, \ldots \lambda n$ (n=2, 3, 4 . . . ) in increasing order of wavelength, and the transmission line lengths between each one of said plurality of light sources and said switching means are L1, L2, L3, . . . Ln in increasing order of wavelength, of the light source corresponding to each transmission line there is a relationship, between the wavelengths and the transmission line lengths, of $L1/L2 \leq \lambda1/\lambda2$, $L1/L3 \leq \lambda1/\lambda3$, . . . $L1/Ln \leq \lambda1/\lambda n$.

4. An optical pickup having:
   a first light source of recording or reproducing information on a record medium;
   a second light source of reproducing the information from said record medium;
   a drive circuit of driving said first light source or second light source;
   switching means of switching a connection between said drive circuit and said first light source or second light source; and
   a control circuit of controlling said drive circuit and said switching means, and wherein:
      a transmission line length between said switching means and said first light source is shorter than that between said switching means and said second light source.

5. An optical pickup having:
   a first light source of recording or reproducing information on a record medium;
   a second light source of reproducing the information from said record medium;
   a first drive circuit of driving said first light source;
   a second drive circuit of driving said second light source;
   switching means of switching a signal from the outside to said first drive circuit or said second drive circuit and outputting it; and
   a control circuit of controlling said first drive circuit, said second drive circuit and said switching means, and wherein:
      a transmission line length between said switching means and said first light source is shorter than that between said switching means and said second light source.

6. An optical pickup having:
   a first light source of recording or reproducing information on a record medium;
   a second light source of reproducing the information from said record medium;
   a drive circuit of driving said first light source or second light source;
   switching means of switching a connection between said drive circuit and said first light source or second light source; and
   a control circuit of controlling said drive circuit and said switching means,
   wherein a transmission line length between said switching means and said first light source is shorter than that between said switching means and said second light source, and
   said first light source is a plurality of light sources corresponding to a plurality of record media, and with respect to transmission line lengths between said switching means and said plurality of light sources, there is a relationship that the shorter wavelength of the light source is the shorter the length of corresponding transmission line is.

7. The optical pickup according to claim 6, wherein, when the wavelength of the light source of the shortest wavelength, of said plurality of light sources, is $\lambda1$ and the wavelengths of the other light sources are $\lambda2, \lambda3, \ldots \lambda n$ (n=2, 3, 4 . . . ) in increasing order of wavelength, and the transmission line lengths between each one of said plurality of light sources and said switching means are L1, L2, L3, . . . Ln in increasing order of wavelength of the light source corresponding to each transmission line, there is a relationship, between the wavelengths and the transmission line lengths, of $L1/L2 \leq \lambda1/\lambda2$, $L1/L3 \leq \lambda1/\lambda3$, . . . $L1/Ln \leq \lambda1/\lambda n$.

8. The optical pickup according to any of claims 1, 2, 4 and 5, wherein said drive circuit and said switching means are configured as one piece.

9. The optical pickup according to any of claims 1, 2, 4 and 5, wherein said light sources and said switching means are configured as one piece.

10. The optical pickup according to claim 7, wherein said n is 2 or 3.

11. An information processing apparatus having:
an optical pickup according to any of claims 1, 2, 4 or 5;
demodulation means of demodulating a signal obtained from said optical pickup; and
modulation means of modulating the signal to be outputted to said optical pickup.

12. An optical information recording and reproducing method of recording and reproducing information on a plurality of record media respectively, said method having:
a driving step of driving any one of a plurality of light sources corresponding to said plurality of said record media;
a switching step of switching a connection of any one of said plurality of light sources in said driving step; and
a controlling step of controlling said driving step and said switching step, and wherein:
each one of transmission line lengths of said plurality of light sources in said switching step, have a relationship that the shorter the wavelength of the light source, the shorter the length of the corresponding transmission line.

13. An optical information recording and reproducing method of recording and reproducing information on a plurality of record media respectively, said method having:
a plurality of driving steps of driving a plurality of light sources corresponding to said plurality of record media respectively,
a switching step of switching a signal from the outside to one of said driving steps and using it; and
a controlling step of controlling said driving step and said switching step, and wherein:
each one of transmission line lengths of said plurality of light sources in said switching step, have a relationship that the shorter the wavelength of the light source, the shorter the length of the corresponding transmission line.

14. The optical information recording and reproducing method according to claim 12 or 13, wherein, when the wavelength of the light source of the shortest wave length, of said plurality of light sources, is $\lambda1$ and the wavelengths of the other light sources are $\lambda2, \lambda3, \ldots \lambda n$ (n=2, 3, 4 . . . ) in increasing order of wavelength, and the transmission line lengths of said plurality of light sources are L1, L2, L3, . . . Ln in increasing order of wavelength of the light source corresponding to each transmission line there is a relationship, between the wavelengths and the transmission line lengths, of $L1/L2 \leq \lambda1/\lambda2$, $L1/L3 \leq \lambda1/\lambda3$, . . . $L1/Ln \leq \lambda1/\lambda n$.

15. An optical information recording and reproducing method having:
a driving step of driving a first light source for recording or reproducing information on a record medium and a second light source for reproducing the information from said record medium;
a switching step of switching said first light source or second light source in said driving step; and
a controlling step of controlling said driving step and said switching step, and wherein:
a transmission line length of said first light source in said switching step is shorter than that of said second light source.

16. An optical information recording and reproducing method having:
a first driving step of driving a first light source for recording or reproducing information on a record medium;
a second driving step of driving a second light source for reproducing the information from said record medium;
a switching step of switching a signal from the outside to said first driving step or said second driving step and outputting it; and
a controlling step of controlling said first driving step, said second driving step and said switching step, and wherein:
a transmission line length of said first light source in said switching step is shorter than that of said second light source.

* * * * *